Patented Dec. 15, 1936

2,064,588

UNITED STATES PATENT OFFICE 2,064,588

PROCESS OF FORMING LIME COMPOSITIONS

Charles I. Chubbuck, San Marino, Calif.

No Drawing. Application December 12, 1933, Serial No. 702,029

6 Claims. (Cl. 106—24)

This invention relates to lime compositions used in preparing mortar or plaster for coating walls or the like, and a process for preparing the same.

An object of the present invention is to provide a lime product which when packed in bags or other porous containers may be stored for long periods without deteriorating.

Another object is to provide a composition of the character stated that will remain substantially cool when slaked and which will set in a manner similar to calcined gypsums.

Another object is to provide a lime product which when made into mortar for plastering (scratch or brown coat) will carry from four to six parts sand by weight, which may be applied immediately after mixing and which will rapidly set after application.

A further object is to provide a lime product which may be used for white coating without the admixture of any gypsum plaster.

The process of forming the product may be carried out in various ways as follows:

A quantity of pure or natural limestone and sulphur is first finely ground or pulverized. The proportions of sulphur to the lime may be varied from 1% to 30% according to the product desired.

The products thus pulverized are then thoroughly mixed and calcined. During calcining a certain amount of the sulphur combines with the lime and results in formation of sulphides. The resultant product is then reground and may be packed in suitable containers for storage or directly for use. During calcining it would appear that most or all of the sulphur present would become volatilized and driven off by the temperature in the calcining furnace, but it has been found in actual practice that a certain portion of it combines with the lime and forms sulphides as above stated.

A similar product may be prepared by adding sulphur in the above quantities to ground limestone and sufficient lime putty in order that the mixed products will become cohesive. The mixture is then calcined and ground.

The product may be prepared by adding the sulphur to lime (calcium oxide) during the process of slaking and the putty thus formed heated sufficiently to expel all the free and combined water. The product should then be ground and pulverized.

The product may be also prepared by adding the sulphur to lime putty (already slaked) mixing same and then heating sufficiently to drive off the free and combined water, then grinding the product.

In the two preceding methods all the combined water need not be expelled to make a satisfactory product. I have also found that the addition of ½ of 1% to 3% of sodium sulphate improves the material.

The sulphur may be added to hydrated lime and the mixture heated sufficiently to expel the combined water, the resulting product then being ground.

I claim:

1. A process of producing a lime product which consists of adding 1% to 30% of sulphur to the lime during the period of slaking, heating the resultant lime putty sufficiently to drive off the free and combined water, and finally grinding the product.

2. A process of producing a lime product which consists of adding 1% to 30% of sulphur to the lime during the period of slaking, heating to drive off the free water and a portion of the combined water, and finally grinding the product.

3. A process of producing a lime product which consists in adding 1% to 30% of sulphur to a lime putty, heating to drive off the free and combined water, and finally grinding the product.

4. A process of producing a lime product which consists in adding 1% to 30% of sulphur to a lime putty, heating to drive off the free water and a portion of the combined water, and finally grinding the product.

5. The process of providing a lime product which consists in adding 1% to 30% of sulphur to hydrated lime, and finally heating the mixture to drive off the combined water.

6. The process of providing a lime product which consists in adding 1% to 30% of sulphur to hydrated lime, and finally heating the mixture to drive off a portion of the combined water.

C. I. CHUBBUCK.